Dec. 18, 1962  J. W. McDUFFIE ETAL  3,068,784
HAY BALER
Filed June 16, 1960  3 Sheets-Sheet 1

INVENTORS
JAMES W. McDUFFIE
& EDWIN B. NOLT
By Joseph Allen Brown
ATTORNEY

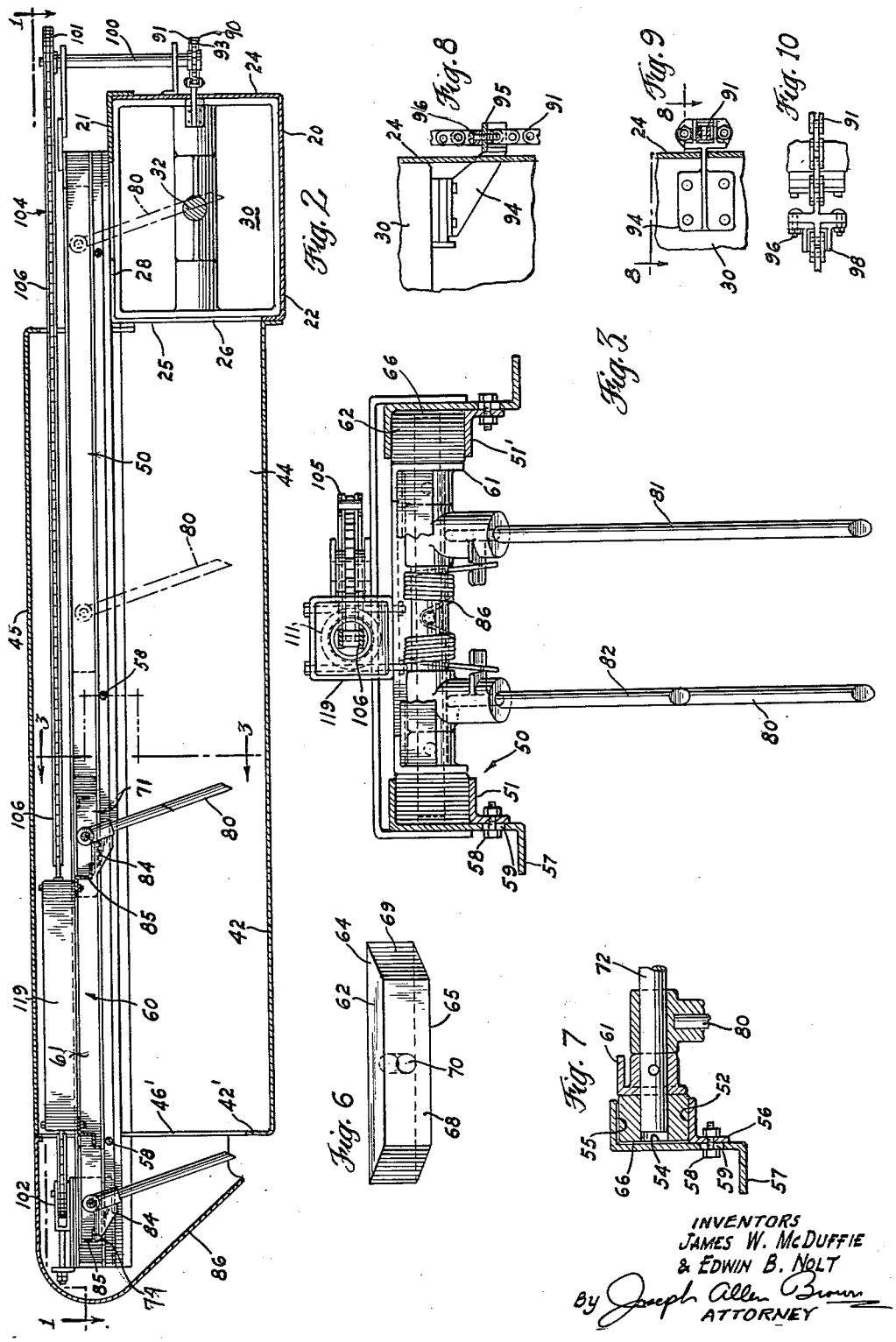

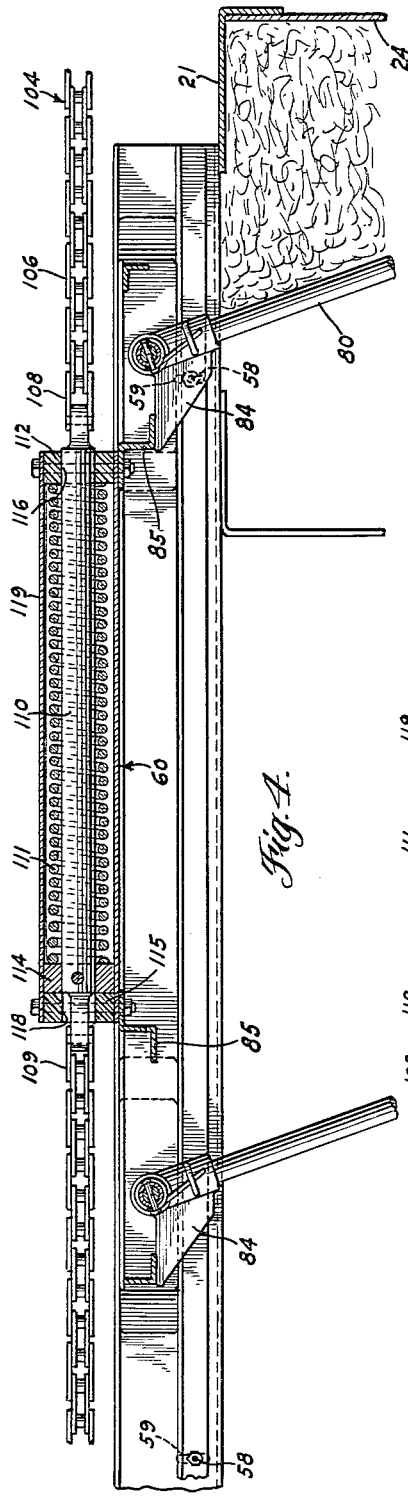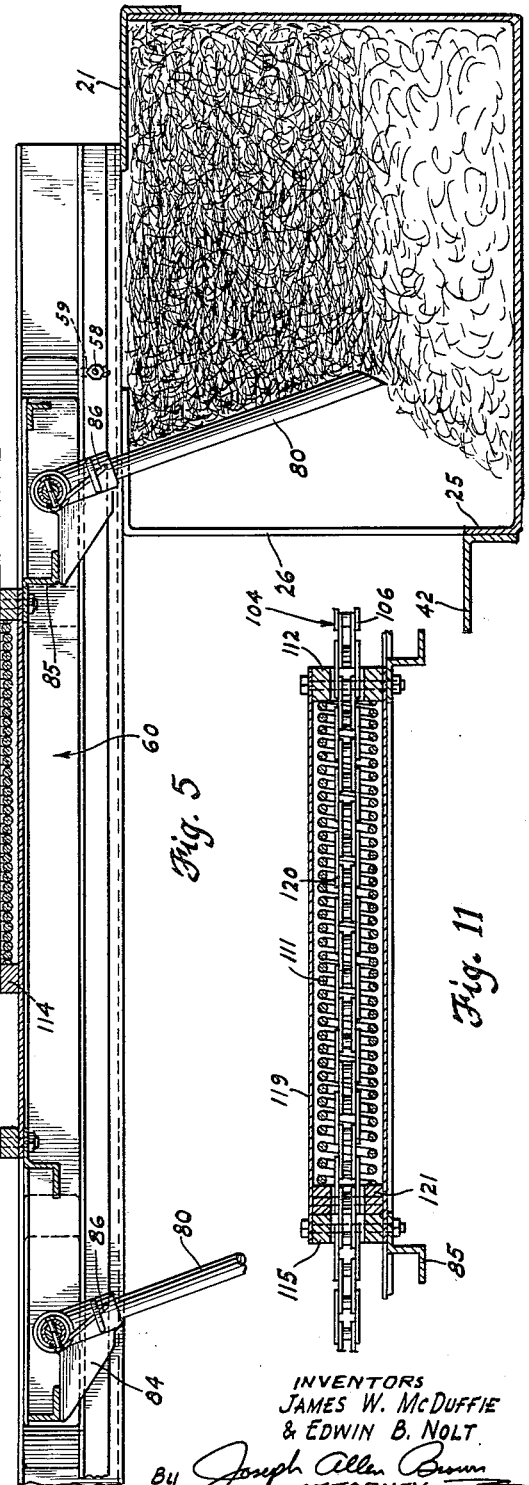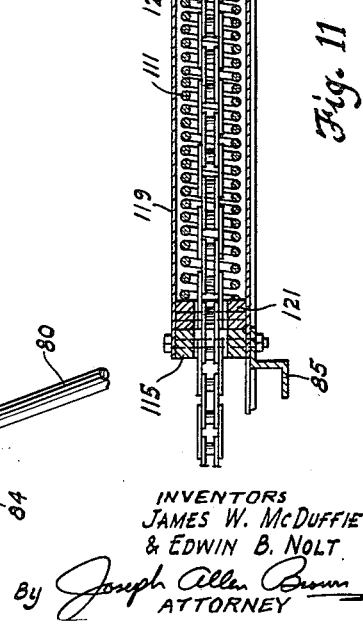

3,068,784
HAY BALER
James W. McDuffie and Edwin B. Nolt, New Holland, Pa., assignors to Sperry Rand Corporation, New Holland, Pa., a corporation of Delaware
Filed June 16, 1960, Ser. No. 36,561
13 Claims. (Cl. 100—142)

The present invention relates generally to automatic hay balers. More particularly, the invention relates to a mechanism for feeding hay into a bale chamber, through an opening in the side wall of the chamber, in timed relation with a compressing plunger.

One object of this invention is to provide a hay baler feeder mechanism having improved, simplified, and more efficient structure than similar mechanisms of prior design.

Another object of this invention is to provide a feeder mechanism which is adapted to yield on a feeding stroke, the forces developed as a result of such yielding being so related to the feeder that torsional and other forces on the feeder are avoided.

Another object of this invention is to provide a feeder mechanism adapted to yield on a feeding stroke responsive solely to baling conditions and not being affected by other forces to which the mechanism is subjected.

Another object of this invention is to provide a feeder mechanism so designed that close manufacturing tolerances are not required.

A further object of this invention is to provide a feeder mechanism which is driven directly from the bale forming plunger of the baler to insure precise timing between the feeder and the plunger, there being provided positive safety means in the drive to protect the feeder, and yieldable means between the drive and the feeder to provide a control of the feeding action responsive to baling conditions.

A still further object of this invention is to provide a feeder mechanism which is of rugged construction and inexpensive to manufacture and repair.

Other objects of this invention will be apparent hereinafter from the specification and from the recital in the appended claims.

In the drawings:

FIG. 2 is a section taken on the lines 2—2 of FIG. 1 looking in the direction of the arrows and showing the feeder in retracted position in solid lines and extended position in dotted lines;

FIG. 3 is an enlarged vertical section taken on the line 3—3 of FIG. 2 looking in the direction of the arrows;

FIGS. 4 and 5 are enlarged, vertical longitudinal sections through the feeder and showing the feed mechanism in two operating conditions;

FIG. 6 is a perspective view showing one of the support bearings of the feeder mechanism;

FIG. 7 is a fragmentary vertical section through one of the corners of the feed mechanism;

FIGS. 8, 9 and 10 are plan, vertical section, and side elevational views, respectively, showing the drive connection between the feeder drive chain and the plunger; and FIG. 11 is a vertical section similar to FIGS. 4 and 5 showing another means of connecting the feeder chain to the feeder carriage.

Figure 1:
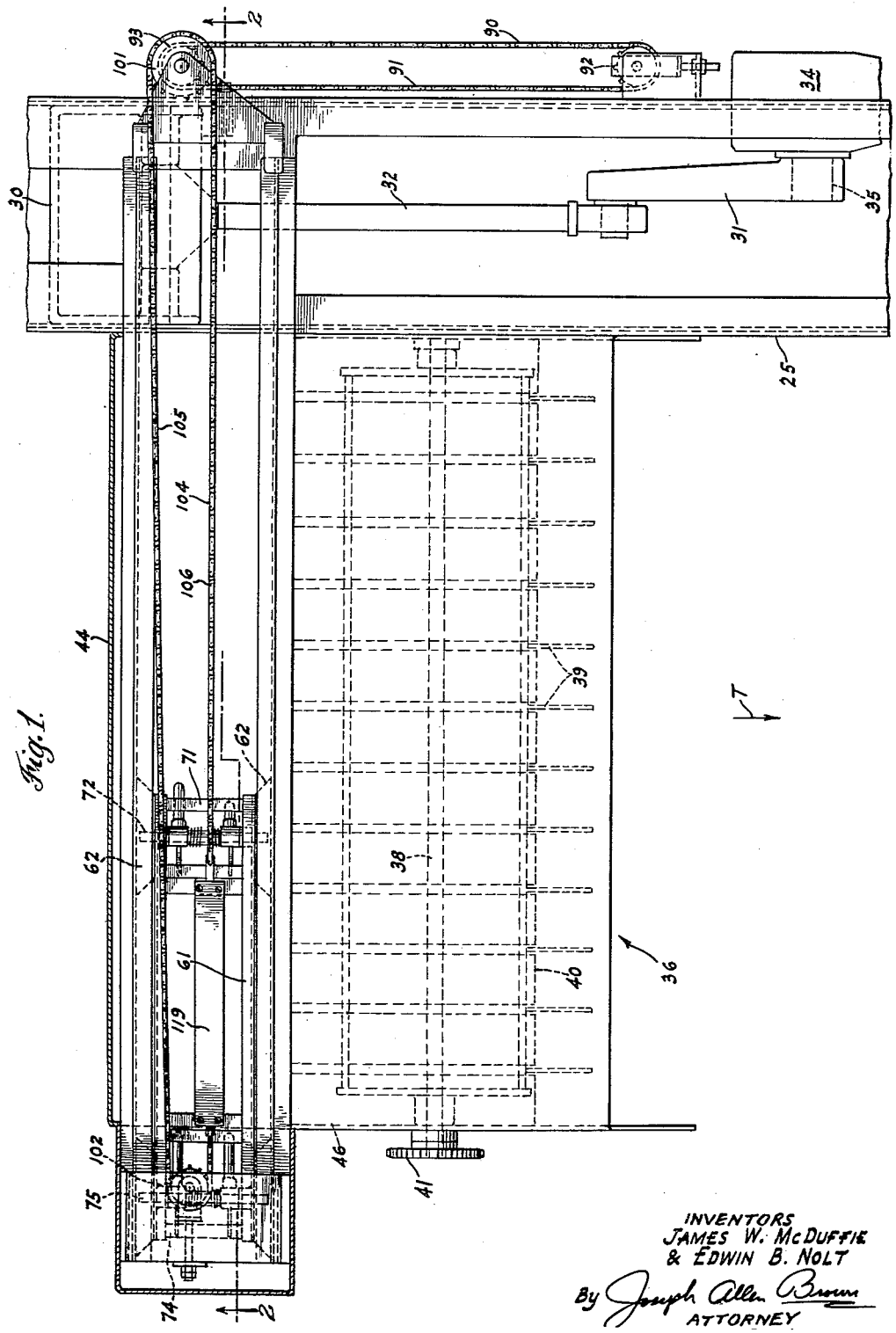
FIG. 1 is a fragmentary, plan section of a hay baler having a feeder mechanism constructed according to this invention, such section being taken on the lines 1—1 of FIG. 2; the baler plunger is shown in extended position and the feed mechanism retracted.

Referring now to the drawings by numerals of reference, and particularly to FIGS. 1–3, 20 denotes the bale chamber or case of a hay baler. Such bale chamber is rectangular in cross section, extending in a fore-and-aft direction relative to the travel of the baler indicated by the arrow T in FIG. 1. The bale chamber has a top wall 21, a bottom wall 22, an outside wall 24 and an inside wall 25. The inside wall 25 is provided with a feed opening 26 through which crop material may be fed into the bale chamber. Top wall 21 is slotted at 28, such slot communicating with the opening 26. Reciprocable in bale chamber 20 is a plunger 30 driven by a rotatable crank arm 31 connected to the plunger by means of a connecting rod 32. The crank arm 31 receives power from a gear box 34 provided with an output shaft 35 to which the crank arm is keyed. Gear box 34 receives power from the tractor (not shown) towing the baler or from some other source.

In its reciprocable movements, the plunger 30 moves rearwardly on a working stroke and past the openings 26 and 28 in the side wall 25 and top wall 21, respectively. After each working stroke it retracts to a position forwardly of the opening 26. Hay delivered to the bale chamber 20 is compressed by the plunger into bales and each bale moves progressively rearwardly as it is formed. After completion, each bale is banded by a typing mechanism, not shown, and subsequently discharged rearwardly onto the ground or to a trailing wagon.

Positioned alongside the side wall 25 of bale chamber 20 and forwardly of the opening 26 is a transversely extending rotatable pick-up mechanism 36 comprising a reel 38 having angularly spaced rows of radially projecting pick-up fingers 39. The fingers in each row are laterally spaced relative to each other and separated by stripper plates 40. A drive sprocket 41 is connected to the reel 38 to rotate the pick-up. Sprocket 41 is driven from a suitable source of power not shown. Cut crop material resting on the ground in a windrow is adapted to be engaged by the fingers 39 and elevated. The material passes upwardly and rearwardly over the stripper plates 40 and is deposited on a hay receiving platform 42. The details of the pick-up structure may be similar to that shown in U. S. Patent No. 2,757,602 issued August 7, 1956.

As shown in FIG. 2, the platform 42 extends horizontally from adjacent the lower end of the opening 26. Rearwardly of the platform 42 is a vertical wall 44 and above the platform is a top wall 45. The pick-up 36 has a lateral side wall 46 (FIG. 1) at its outboard end. The side wall 25 of the bale chamber 20 provides the other side wall of the pick-up. Thus, crop material engaged by the pick-up is elevated and moved rearwardly between the bale case and side wall 46. The material is stopped in its rearward movement by the wall 44 behind the feed platform 42.

The bale chamber 20, pick-up 36 and feed platform 42, as well as the other baler structure, are carried on a conventional mobile frame, not shown.

For feeding crop material across platform 42, through opening 26 and into bale chamber 20 between successive compression strokes of plunger 30, a feeder mechanism is provided comprising a track 50 having a pair of spaced channel structures 51 and 51' as shown best in FIGS. 3 and 7. Each channel structure has a bottom wall 52, a side wall 54 and a top wall 55. The bottom wall is formed by one leg of an angle iron, the other leg 56 of which is connected to Z member 57 by bolts 58 passing through vertical slots 59. Wall 52 can be adjusted toward top wall 55 to compensate for wear or away from the top wall to provide a greater space between the walls. The open portion of each channel is directed inwardly. The track 50 extends transverse to the direction of reciprocation of the plunger 30 having one end positioned above the bale chamber 20 and an opposite end remote from the bale chamber and extending beyond the remote or outboard end 42' of the platform 42. As shown in FIG. 2, the track 50 and the platform 42 extend parallel to each other. The track 50 and platform 42 define a space adapted to receive hay from the pick-up 36.

Supported on track 50 and movable thereover toward and away from bale chamber 20 is a carriage 60. Carriage 60 comprises a framework 61 which is generally rectangular when viewed in plan, FIG. 1. The carriage has four support bearings 62, one at each corner of the framework. The support blocks are made of a hard wood, such as rock maple, and each block is formed as shown in FIG. 6. Each block has a top face 64 and a bottom flat face 65 which are parallel to each other and engageable with the top and bottom walls 52 and 55, respectively, of the track channels. The outside wall 66 of each block engages channel wall 54 and each outside wall is longer than the inside wall 68 of each block. The inside and outside walls of the blocks are connected by bevelled ends 69.

The bevelled ends 69 of the blocks keep track 50 clear when the carriage is moved thereover. Dust, dirt or the like is scraped and directed outwardly of the track channels.

Each block has a hole therethrough denoted 70 which extends from the inside wall 68 to the outside wall 66. Carriage 60 has a forward end 71 (FIG. 1) which carries a shaft 72. The shaft 72 is journalled on the carriage framework 61 and the ends of the shaft extend into the forward pair of support blocks 62. The carriage 60 has a rear end 74 which carries a support shaft 75 journalled on framework 61 and having ends projecting into the rear support blocks 62. The carriage is constructed like a bob-sled, the blocks at the respective corners being adapted to pivot relative to the carriage about the mounting shafts. Therefore, when the carriage moves along the track 50, unevenness in the channels 51—51' and variations in manufacturing tolerances are compensated for.

Mounted on the shafts 72 and 75 are pairs of depending feed fingers 80. The pair of fingers on the forward end 71 of the carriage comprises two fingers of different lengths. The finger 81 close to wall 44 behind platform 42 is longer than the forward finger 82. The fingers at the rear end of the track are of the same length as finger 81.

As shown in FIG. 2, the feed fingers are disposed at an inclination relative to the vertical. Specifically, the fingers are mounted with the lower ends of the fingers being closer to bale case 20 than the upper ends. The fingers are so mounted on shafts 72 and 75 that they are free to pivot in a counterclockwise direction when viewed as shown in FIG. 2. However, the fingers may not pivot in a clockwise direction from their normal positions, each pair of fingers being provided with a stop tab 84 which engages a stop bracket 85 on the carriage 60. Brackets 85 form part of the carriage framework.

When carriage 60 moves toward bale case 20, from the solid line position shown in FIG. 2, to the dotted line position, the fingers extend rigidly relative to the carriage and are not pivotal in a clockwise direction and away from the bale chamber. However, when the carriage moves away from the bale chamber, from the dotted line position toward the solid line position, the feed fingers are free to pivot in a counterclockwise direction and lay back when the carriage returns. Such lay back will result from engagement of the fingers with hay on platform 42. Light springs 86 are provided to constantly urge the fingers toward normal position.

Also as shown in FIG. 2, the pair of fingers on the rear end 74 of the carriage extend beyond the outboard end 42' of the feed platform 42 when carriage 60 is retracted. The side wall 46 is provided with a suitable opening 46' to allow the fingers to move outwardly of the wall. The top wall 45 has a downwardly and inwardly curved hood portion 86 which shields the overhanging portion of the track and carriage. Such overhang is provided so that when the carriage moves above the platform 42, it moves across the full length of the platform.

In order to reciprocate carriage 60 toward and away from the bale chamber in timed relation with the reciprocations of the plunger 30, a drive means is provided comprising an endless chain 90 (FIG. 1) which extends in a fore-and-aft direction alongside the outside wall 24 of bale case 20. Chain 90 has an inside reach 91 which extends parallel to bale case 20 and the direction of reciprocation of the plunger 30. Chain 90 is supported by a pair of sprockets 92 and 93 rotatable about vertical axes. The inner-reach 91 is connected to the plunger 30 as shown in FIGS. 8, 9 and 10. Fastened to plunger 30 is a laterally extending bracket 94 having an upstanding flange 95 outside of bale case 20 and to which the chain 91 is connected by shear bolts 96. When the plunger 30 is reciprocated, the chain 90 is oscillated. If an overload situation results sufficient to break the shear bolts 96, then the drive between the plunger 30 and the chain 90 is separated. A block 98 fastened to chain 90 on one side of flange 95 provides a positive connection between the chain and the plunger in one direction of movement of the plunger. Bolts 96 provide a shearable connection when the plunger moves in the opposite direction.

Connected to sprocket 93 is a vertically extending shaft 100 suitably rotatably supported on bale case 20. Shaft 100 has a drive sprocket 101 at its upper end. Extending around sprocket 101 and an idler sprocket 102 at the outboard end of the track 50 is an endless chain 104. Chain 104 has a rearward reach 105 and a forward reach 106, FIG. 1. The reach 106 extends parallel to the track 50 and in a vertical plane between the two channel structures 51 and 51'. Chain 104 is oscillated by virtue of its connection with chain 90. The forward reach 106 is connected to the carriage 60 to reciprocate it in timed relation to the plunger 30. Such connection is shown best in FIGS. 4 and 5.

Reach 106 has two ends 108 and 109 which are connected to the respective ends of an elongate control member 110. The axis of the member 110 is common with the extension of the reach 106. Likewise, member 110 extends parallel to the track 50 and is disposed between the channel member 51 and 51'. The control member 110 is mounted on the carriage 60 substantially midway between the forward and rear ends 71 and 74, respectively, of the carriage. As shown, the forward feed fingers are normally disposed forwardly of the control member 110 as shown in FIG. 4 while the rear feed fingers are disposed rearwardly of the control member.

Control member 110 is connected to carriage 60 by means of a compression spring 111 the coils of which surround the member. Spring 111 is interposed between a fixed stop-bearing 112 at the forward end 71 of carriage 60 and a piston member 114 pinned to the rear end of the control member. Preferably stop 112 and piston 114 are made of nylon or some other selflubricating bearing material. The spring 111 constantly biases the piston 114 toward the left of FIG. 4. Such movement of the piston is stopped by a stop ring member 115 bolted to the carriage 60. The forward member 112 has an opening 116 through which the forward end of control member 110 extends. The stop member 115 has an opening 118 through which the rear end of the control member extends and also through which the end 109 of reach 106 of the chain 104 is reciprocable. The spring 111 is completely enclosed by a housing 119. Housing 119 is rectangular in section, and piston 114 is also rectangular whereby rotation of the control member relative to the carriage is prevented. The axis of the spring, the axis of control member 110 and the extension of reach 106 are all common.

In operation, when chain 104 is oscillated responsive to the drive from the chain 90 connected to plunger 30, carriage 60 is reciprocated by a drive transmitted to it through control member 110. When the carriage is moved from the position shown in solid lines in FIG. 2 to the dotted line position of FIG. 2, the reach 106 of the chain 104 moves toward the right. The drive to the carriage 60 is through the spring 111. Under normal operating conditions, spring 111 will remain extended and the forward fingers on the carriage will be projected into bale case 20 as shown in FIG. 4. As indicated, the forward pair of fingers move into the bale case approximately one half of the distance between the side walls 24 and 25. The rearward set of fingers remain outside the bale case. If there is an excessive accumulation of hay to be delivered toward the bale chamber 20, as shown in FIG. 5, the front fingers on the carriage 60 will be arrested in their movement toward the bale chamber. Such resisting force will be transmitted to the carriage, and the control member 110 will move longitudinally relative thereto and against the resistance of the spring 111. The spring 111 will be compressed as shown in FIG. 5 thereby providing a yieldable infeed of material into the bale case 20. When the chain 104 moves in the opposite direction, member 110 will be moved to the left until the piston 114 engages the stop 115. Thereupon, there will be a positive drive of the carriage to thereby withdraw it to its retracted position.

It will thus be seen that when the carriage moves toward the bale case 20, the drive to it is through the resilient means 111 while on a return stroke, the retraction of the carriage is positive. It will also be noted (FIG. 2) that with each stroke, the carriage moves slightly over one half the width of platform 42. The fingers remote from the bale case deliver hay beyond the starting point of the fingers adjacent the bale case.

Since control member 110 is disposed with its axis common to the extension of the reach 106 of the chain 104, forces transmitted to the spring 111 surrounding the control member are coaxial with the member and there are no torsional or cocking forces placed upon the carriage. Therefore, a desirable feeding control is provided and the spring 111 is responsive directly to the engagement of the feed fingers with the hay on the platform and not to any resistances resulting from engagement of the control member with the bearings which support it. Also, by having the shear bolt means in the chain 90, a simple, easily repaired connection point is provided. The shear bolt means will break to protect the feeding operation of the baler but the feeder mechanism itself does not have to be repaired. Having the shear means in the endless chain 90 while the resilient means is provided in the endless chain 104 simplifies operative and repair problems.

The structure described is simple, rugged and relatively inexpensive to manufacture and assemble. The relationship of the parts and the forces to which carriage 60 are subjected are so located that wear and tear are kept to a minimum. When blocks 62 become worn, walls 51 of the channels can be raised to compensate for such wear and thereby get maximum life out of the parts involved.

Referring now to FIG. 11, there is shown a connection between chain 104 and carriage 60 constructed according to another embodiment of this invention. Parts in this figure the same as parts in FIGS. 1—10 bear like numerals. As shown, reach 106 of chain 104 extends all the way through housing 119, there being no control shaft as shown in FIGS. 4 and 5. Reach 106 is continuous, having a section 120 within housing 119 which is equivalent to control member 110. Fastened to the chain is a piston 121 which supports and guides reach section 120 when it moves relative to the carriage. Having reach 106 continuous, eliminates the connection points between the chain and the control member and provides great structural simplicity. Housing 119 serves to prevent or at least limit lateral deflection of spring 111.

While this invention has been described in connection with two embodiments thereof, it will be understood that it is capable of further modifications, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A hay baler comprising a bale case having a feed opening in a side wall thereof, a hay receiving platform extending laterally from said side wall, a track mounted above said platform, a carriage mounted on said track for movement therealong toward and away from said bale case and in a given generally horizontal plane, hay engageable means depending from said carriage, a control member mounted on said carriage and movable relative thereto, said control member having a forward end toward said bale case and a rear end remote therefrom, a member fixed to said carriage adjacent said forward end of said control member, a piston connected to said rear end of said control member, resilient means interposed between said fixed member and said piston and yieldably resisting movement of the piston toward the fixed member, a flexible member having two ends, one connected to said forward end of said control member and the other connected to said rear end of the control member, and means for oscillating said flexible member.

2. A hay baler comprising a bale case having a feed opening in a side wall thereof, a hay receiving platform extending laterally from said side wall, a track mounted above said platform, a carriage mounted on said track for movement therealong toward and away from said bale case and in a given generally horizontal plane, hay engageable means depending from said carriage, a control member mounted on said carriage and movable relative thereto, said control member being elongate and having a forward end proximate to said bale case and a rear end remote therefrom, a member fixed to said carriage and through which said forward end of said control member is projectionable, a stop member fixed to said carriage adjacent said rear end of said control member, a piston member connected to said rear end of said control member, a spring surrounding said control member and having opposite ends engaging said fixed and piston members, respectively, said spring yieldably resisting movement of said piston member toward said fixed member, a flexible member having two ends, one connected to said forward end and the other to said rear end of said control member, said stop member having an opening through which said other end of said flexible member projects, and means for oscillating said flexible member.

3. A hay baler comprising a bale case having a feed opening in a side wall thereof, a hay receiving platform extending laterally from said side wall, a track mounted above said platform, a carriage mounted on said track for movement therealong toward and away from said bale case in a given generally horizontal plane, hay engageable means depending from said carriage, a control member mounted on said carriage and movable relative thereto, said control member having a forward end and a rear end, a member fixed to said carriage and having an opening through which said forward end of said control member is projectable, a piston connected to said rear end of said control member, resilient means interposed between said fixed member and said piston yieldably resisting movement of the piston toward the fixed member, a stop connected to said carriage and engageable with said piston to limit movement of said piston away from said fixed member, said stop having an opening aligned with said fixed member opening, a flexible member having two ends, one connected to said forward end and the other to said rear end of said control member, said other end of said flexible member projecting through said stop opening, and means for oscillating said flexible member.

4. A hay baler comprising a bale case having a feed opening in a side wall thereof, a hay receiving platform extending laterally from said side wall, a track mounted above said platform, a carriage mounted on said track for movement therealong toward and away from said bale case and in a given generally horizontal plane, hay engageable means depending from said carriage, a control member mounted on said carriage and movable relative thereto, said control member being elongate and having a forward end toward said bale case and a rear end remote therefrom, a tubular member surrounding said control member, a ring fixed to one end of said tubular member and through which said forward end of said control member is projectable, a stop ring affixed to the opposite end of said tubular member and through which said rear end of said control member is projectable, a piston member disposed between said fixed and stop rings and connected to said rear end of said control member, said piston being engageable with said stop member to limit movement of the piston away from said fixed member, a compression spring surrounding said control member and having opposite ends engaging said fixed member and said piston, respectively, a flexible member having two ends, one connected to said forward end and the other to said rear end of said control member, and means for oscillating said flexible member.

5. A hay baler comprising a bale case having a feed opening in a side wall thereof, a hay receiving platform extending laterally from said side wall, and a device for feeding material across said platform and into said bale case through said feed opening, said device comprising a track having a pair of generally horizontally extending parallel channel structures, each of said channel structures having top and bottom walls vertically spaced relative to each other, a carriage mounted on said track for movement therealong, hay engageable means depending from said carriage, said carriage having a forward end toward said bale case and a rear end remote therefrom, a pair of bearing supports on said forward end, a pair of bearing supports on said rear end, one of each pair of bearing supports being slidably engageable with the top and bottom walls of one channel structure of said track and the other bearing supports being slidably engageable with the top and bottom walls of the other channel structure of the track, a flexible drive member having a reach extending parallel to said track and in a vertical plane between said channel structures, and means yieldably connecting said reach and said carriage, said connecting means including a resilient member supported on said carriage between the reach and the carriage and in such location that it is yieldable along a line common with said reach.

6. A hay baler comprising a bale case having a feed opening in a side wall thereof, a hay receiving platform extending laterally from said side wall, and a device for feeding material across said platform and into said bale case through said feed opening, said device comprising a track having a pair of generally horizontally extending parallel channel structures, each of said channel structures having top and bottom walls vertically spaced relative to each other, a carriage mounted on said track for movement therealong, hay engageable means depending from said carriage, said carriage having a forward end toward said bale case and rear end remote therefrom, a pair of bearing supports on said forward end, a pair of bearing supports on said rear end, one of each pair of bearing supports being slidably engageable with the top and bottom walls of one channel structure of said track and the other bearing supports being slidably engageable with the top and bottom walls of the other channel structure of the track, the top wall of each of said channel structures being fixed and the bottom wall being vertically adjustable toward and away from said top wall, a flexible drive member having a reach extending parallel to said track and in a vertical plane between said channel structures, and means yieldably connecting said reach and said carriage, said connecting means including a resilient member supported on said carriage between the reach and the carriage and in such location that it is yieldable along a line common with the reach.

7. A hay baler comprising a bale case having a feed opening in a side wall thereof, a hay receiving platform extending laterally from said side wall, and a device for feeding material across said platform and into said bale case through said feed opening, said device comprising a track having a pair of generally horizontally extending parallel channel structures, a carriage mounted on said track for movement therealong, hay engageable means depending from said carriage, said carriage having a forward end and a rear end, a pair of bearing supports on said forward end, a pair of bearing supports on said rear end, one of each pair of bearing supports being slidable on one channel structure of said track and the other bearing supports being slidable on the other channel structure of the track, an elongate control member extending parallel to said track, means supporting said control member on said carriage for longitudinal shiftable movement relative thereto, an oscillating flexible drive member having a reach coextensive with said control member, said reach having ends connected, respectively, to opposite ends of said control member whereby when said drive member is oscillated said control member is oscillated, and resilient means yieldably connecting said control member to said carriage.

8. A hay baler as recited in claim 7 wherein said forward end of said carriage has a member fixed to it through which one end of said control member reciprocates, an opposite end of said control member having a piston affixed thereto, and said resilient means being interposed between said fixed member and said piston.

9. A hay baler as recited in claim 8 wherein said rear end of said carriage has a stop member fixed to it which engages said piston and limits movement of the piston away from said fixed member, said stop member having an opening through which said flexible drive member extends, and said resilient means comprising a compression spring surrounding said control member and having an axis coextensive with said reach of said flexible member.

10. A hay baler comprising a bale case having a feed opening in a side wall thereof, a hay receiving platform extending laterally from said side wall, and a device for feeding material across said platform and into said bale case through said feed opening, said device comprising a track having a pair of laterally spaced, generally horizontally extending parallel channels, each of said channels having a top wall, a bottom wall and an outside wall, a carriage mounted on said track for reciprocable movement toward and away from said bale case, hay conveying means depending from said carriage and engageable with hay on said platform, said carriage having a forward end toward said bale case and a rear end remote therefrom, a pair of bearing supports on said forward end, a pair of bearing supports on said rear end, one of each pair of bearing supports being slidable on one channel of said track and the other bearing support of each pair being slidable on the other channel of said track, each of said bearing supports being elongate in the direction of movement of said carriage and having top and bottom substantially flat parallel faces engageable, respectively, with the top and bottom walls of the channel supporting it, each bearing support having bevelled front and rear ends, and means connecting each bearing support to said carriage for movement relative to the carriage independently of the other supports.

11. A hay baler as recited in claim 10 wherein each of said support bearings is mounted for pivotal movement relative to said carriage and each support bearing has an outside face engageable with the outside wall of the channel on which it is slidable, and said bottom walls of said channels being adjustable toward and away from the top walls of the channels to compensate for wear of said support bearings.

12. In combination, a hay baler having a bale case, a feeder movable toward and away from said bale case, a chain-like flexible drive member extending parallel to the direction of movement of said feeder, said feeder comprising a carriage having a front end toward said bale case and a rear end remote from the bale case, feed members depending from said front and rear ends of said carriage, resilient means mounted on said carriage between said front and rear ends, means connecting said drive member to said resilient means, said carriage being movable over a support track having laterally spaced parallel track members, said resilient means being disposed in a plane between said track members and being extendable and contractable along a given line, said given line being located on and coextensive with the extension of said drive member.

13. A hay baler comprising, in combination, a bale case having a feed opening in a side wall thereof, a hay receiving platform extending laterally from said side wall, a track mounted above said platform, a carriage mounted on said track for rectilinear movement therealong toward and away from said bale case and in a given generally horizontal plane, hay engageable means depending from said carriage, said carriage having a forward end toward said bale case and a rear end remote therefrom, an endless chain-like member having a reach extending generally parallel to said rectilinear movement of said carriage, means for oscillating said endless member, a member fixed to said carriage adjacent said forward end, a coil spring surrounding said reach and having one end engaging said fixed member, a piston affixed to said one reach and engaging the opposite end of said spring, said spring providing an extensively yieldable connection between said endless member and said carriage when the carriage moves toward said bale case, and a stop member on said carriage with which said piston is engageable to provide a positive conenction between said endless member and said carriage when the carriage is moved away from said bale case.

References Cited in the file of this patent

UNITED STATES PATENTS

| 1,226,851 | Borden | May 22, 1917 |
| 1,396,588 | Nittel | Nov. 8, 1921 |
| 2,545,188 | Baskerville | Mar. 13, 1951 |
| 2,757,602 | Nolt | Aug. 7, 1956 |
| 2,926,601 | Tarbox et al. | Mar. 1, 1960 |
| 2,929,313 | Luthman et al. | Mar. 22, 1960 |
| 2,948,101 | Long | Aug. 9, 1960 |
| 2,950,670 | Nolt et al. | Aug. 30, 1960 |

FOREIGN PATENTS

| 104,455 | Austria | Oct. 25, 1926 |
| 1,223,762 | France | Feb. 1, 1960 |